United States Patent
Fujisawa et al.

(10) Patent No.: US 10,184,359 B2
(45) Date of Patent: Jan. 22, 2019

(54) WASTE HEAT RECOVERY DEVICE AND WASTE HEAT RECOVERY METHOD

(71) Applicants: Kobe Steel, Ltd., Kobe-shi (JP); MIURA Co., Ltd., Matsuyama-shi (JP); ASAHI SHIPPING CO., LTD., Minato-ku (JP); TSUNEISHI SHIPBUILDING Co., Ltd., Fukuyama-shi (JP)

(72) Inventors: Ryo Fujisawa, Kobe (JP); Kazuo Takahashi, Kobe (JP); Yuji Tanaka, Kobe (JP); Shigeto Adachi, Takasago (JP); Yutaka Narukawa, Takasago (JP)

(73) Assignees: Kobe Steel, Ltd., Kobe-shi (JP); MIURA Co., Ltd., Matsuyama-shi (JP); ASAHI SHIPPING CO., LTD., Minato-ku (JP); TSUNEISHI SHIPBUILDING Co., Ltd., Fukuyama-shi (JP)

( * ) Notice: Subject to any disclaimer, the term of this patent is extended or adjusted under 35 U.S.C. 154(b) by 242 days.

(21) Appl. No.: 14/662,701

(22) Filed: Mar. 19, 2015

(65) Prior Publication Data
US 2015/0285102 A1 Oct. 8, 2015

(30) Foreign Application Priority Data

Apr. 4, 2014 (JP) ................. 2014-077646

(51) Int. Cl.
*F01K 13/02* (2006.01)
*F01K 23/02* (2006.01)
(Continued)

(52) U.S. Cl.
CPC .............. *F01K 23/02* (2013.01); *F01K 13/02* (2013.01); *F01K 23/065* (2013.01); *F01K 23/18* (2013.01);
(Continued)

(58) Field of Classification Search
CPC ........ F01K 23/02; F01K 23/18; F01K 23/065; F02G 5/00; F02G 5/04; F02B 29/0443;
(Continued)

(56) References Cited

U.S. PATENT DOCUMENTS 3,826,282 A * 7/1974 Noe .......................... F01K 3/22
137/625.69
4,033,135 A * 7/1977 Mandrin ................. F01K 23/02
60/618
(Continued)

FOREIGN PATENT DOCUMENTS

CN 102834591 A 12/2012
CN 103671052 A 3/2014
(Continued)

OTHER PUBLICATIONS

English Translation of Okazaki et al. (JP 2013-167241), Aug. 29, 2013.*

(Continued)

*Primary Examiner* — Laert Dounis
(74) *Attorney, Agent, or Firm* — Oblon, McClelland, Maier & Neustadt, L.L.P.

(57) ABSTRACT

A waste heat recovery device including: a heater which evaporates an working medium by exchanging heat between supercharging air supplied to an engine and the working medium; a heat exchanger which heats the working medium by exchanging heat between the working medium which has flowed out from the heater and a heating medium; and an expander into which the working medium which has flowed out from the heat exchanger flows; a motive power recovery device; a condenser which condenses the working medium; and a pump which sends the working medium to a heater.

13 Claims, 4 Drawing Sheets

(51) Int. Cl.
*F01K 23/06* (2006.01)
*F01K 23/18* (2006.01)
*F02B 29/04* (2006.01)
*F02G 5/00* (2006.01)

(52) U.S. Cl.
CPC ............ *F02B 29/0443* (2013.01); *F02G 5/00* (2013.01); *Y02T 10/144* (2013.01); *Y02T 10/146* (2013.01); *Y02T 10/166* (2013.01)

(58) Field of Classification Search
CPC .... F02B 29/04; F02B 29/0437; Y02T 10/166; Y02T 10/146; Y02T 10/144; F01N 5/00
USPC .................. 60/597–598, 670, 671, 616–618
See application file for complete search history.

(56) References Cited

U.S. PATENT DOCUMENTS

| | | | | |
|---|---|---|---|---|
| 5,609,029 | A * | 3/1997 | Ahnger | F01K 23/065 60/618 |
| 5,896,746 | A * | 4/1999 | Platell | F01K 23/065 60/618 |
| 8,881,523 | B2 * | 11/2014 | Kasuya | F01K 13/02 60/618 |
| 2005/0132704 | A1 * | 6/2005 | Kang | F01K 23/101 60/597 |
| 2005/0247059 | A1 * | 11/2005 | Cogswell | F01K 13/02 60/645 |
| 2009/0211253 | A1 * | 8/2009 | Radcliff | F01K 23/065 60/670 |
| 2010/0282451 | A1 * | 11/2010 | Singh | F01K 7/06 165/162 |
| 2010/0307155 | A1 | 12/2010 | Kasuya et al. | |
| 2011/0041505 | A1 * | 2/2011 | Kasuya | F01K 23/065 60/660 |
| 2012/0023946 | A1 * | 2/2012 | Ernst | F01K 9/04 60/660 |
| 2012/0285169 | A1 | 11/2012 | Freund et al. | |
| 2013/0068202 | A1 * | 3/2013 | Kardos | F01P 3/20 123/563 |
| 2014/0075941 | A1 | 3/2014 | Adachi et al. | |

FOREIGN PATENT DOCUMENTS

| | | | | |
|---|---|---|---|---|
| FR | 2416340 | A1 * | 8/1979 | ............. F01K 23/06 |
| JP | 52-45032 | A | 4/1977 | |
| JP | 58-122581 | A | 7/1983 | |
| JP | 2011074897 | A * | 4/2011 | |
| JP | 2013-167241 | A | 8/2013 | |
| JP | 2013180625 | A * | 9/2013 | |
| JP | 2013-238131 | A | 11/2013 | |
| WO | WO 2009/101977 | A1 | 8/2009 | |
| WO | WO 2013/031287 | A1 | 3/2013 | |

OTHER PUBLICATIONS

Korean Office Action dated Jun. 22, 2016 in Patent Application No. 10-2015-0045917 (with English Translation).
Combined Chinese Office Action and Search Report dated Feb. 22, 2016 in Patent Application No. 201510133321.3 (with English language translation of the Office Action and English language translation of categories of cited documents).
Japanese Office Action dated May 9, 2017 in Japanese Patent Application No. 2014-077646 (with unedited computer generated English translation).

* cited by examiner

WASTE HEAT RECOVERY DEVICE AND WASTE HEAT RECOVERY METHOD

TECHNICAL FIELD

The present invention relates to a waste heat recovery device and a waste heat recovery method.

BACKGROUND ART

Conventionally, a waste heat recovery device is known for recovering waste heat from supercharging air supplied to an engine. For example, Japanese Unexamined Patent Publication No. 2013-167241 discloses a waste heat recovery device, including: a heat exchanger which evaporates an working medium by exchanging heat between pressurized intake air and an working medium; an expander which expands the working medium which has flowed out from the heat exchanger; a power generator connected to the expander; a condenser which condenses the working medium which has flowed out from the expander; a pump which sends the working medium which has flowed out from the condenser, to the heat exchanger; and a controller which controls the number of revolutions of the pump in accordance with the thermal load on the heat exchanger. When the thermal load becomes larger, the controller increases the number of revolutions of the pump on the basis of previously stored information. Consequently, the amount of waste heat recovered (the amount of electric power generated by the power generator) is increased. On the other hand, when the thermal load becomes smaller, the number of revolutions of the pump is reduced on the basis of the information. In other words, the vaporization of the working medium in the heat exchanger is prioritized.

In the waste heat recovery device disclosed in Japanese Unexamined Patent Publication No. 2013-167241, it is difficult to recover waste heat stably in a broad range from a low to a high thermal load state of the heat exchanger (prime mover load state). More specifically, when the thermal load on the heat exchanger declines, the amount of heat which can be recovered by the working medium in the heat exchanger is extremely small, and therefore even if the controller reduces the number of revolutions of the pumps, there is a risk of the working medium flowing out from the heat exchanger and flowing into the expander, in a gas-liquid two-phase state where the working medium is not sufficiently evaporated in the heat exchanger. In order to prevent a situation of this kind, it is necessary to stop the pump (stop the recovery of waste heat), when the thermal load has declined. In other words, in the waste heat recovery device disclosed in Japanese Unexamined Patent Publication No. 2013-167241, it is not possible to recover the waste heat stably, especially in a state of low thermal load.

SUMMARY OF INVENTION

An object of the present invention is to provide a waste heat recovery device and a waste heat recovery method whereby waste heat can be recovered stably in a broad range from a low engine load to a high engine load.

The waste heat recovery device according to one aspect of the present invention includes: a heater which evaporates an working medium by exchanging heat between supercharging air supplied to the engine and the working medium; a heat exchanger which heats the working medium by exchanging heat between the working medium which has flowed out from the heater, and a heating medium; an expander which expands the working medium which has flowed out from the heat exchanger; a motive power recovery device which is connected to the expander; a condenser which condenses the working medium which has flowed out from the expander; and a pump which sends the working medium which has flowed out from the condenser, to the heater.

Furthermore, the waste heat recovery method according to another aspect of the present invention is a method for recovering the waste heat of the supercharging air supplied to the engine. This waste heat recovery method includes: an evaporating step for evaporating an working medium by a heater, by supplying the supercharging air to the heater; a heating step for heating the working medium by exchanging heat between the working medium which has flowed out from the heater and a heating medium in use of a heat exchanger; a motive power recovery step for recovering motive power from the working medium, by expanding the working medium which has flowed out from the heat exchanger in use of an expander; a condensing step for condensing the working medium which has flowed out from the expander in use of a condenser; and a pump driving step for sending in use of a pump the working medium which has flowed out from the condenser to the heater. In the pump driving step, the number of revolutions of the pump is increased and reduced in accordance with increase and decrease in a differential pressure between pressure of the supercharging air before flowing into the heater and pressure of the supercharging air after having flowed out from the heater.

DESCRIPTION OF EMBODIMENTS

Below, embodiments of the present invention are described with reference to the drawings. The embodiments described below are concrete examples of the present invention and do not limit the technical scope of the present invention.

Figure 1:
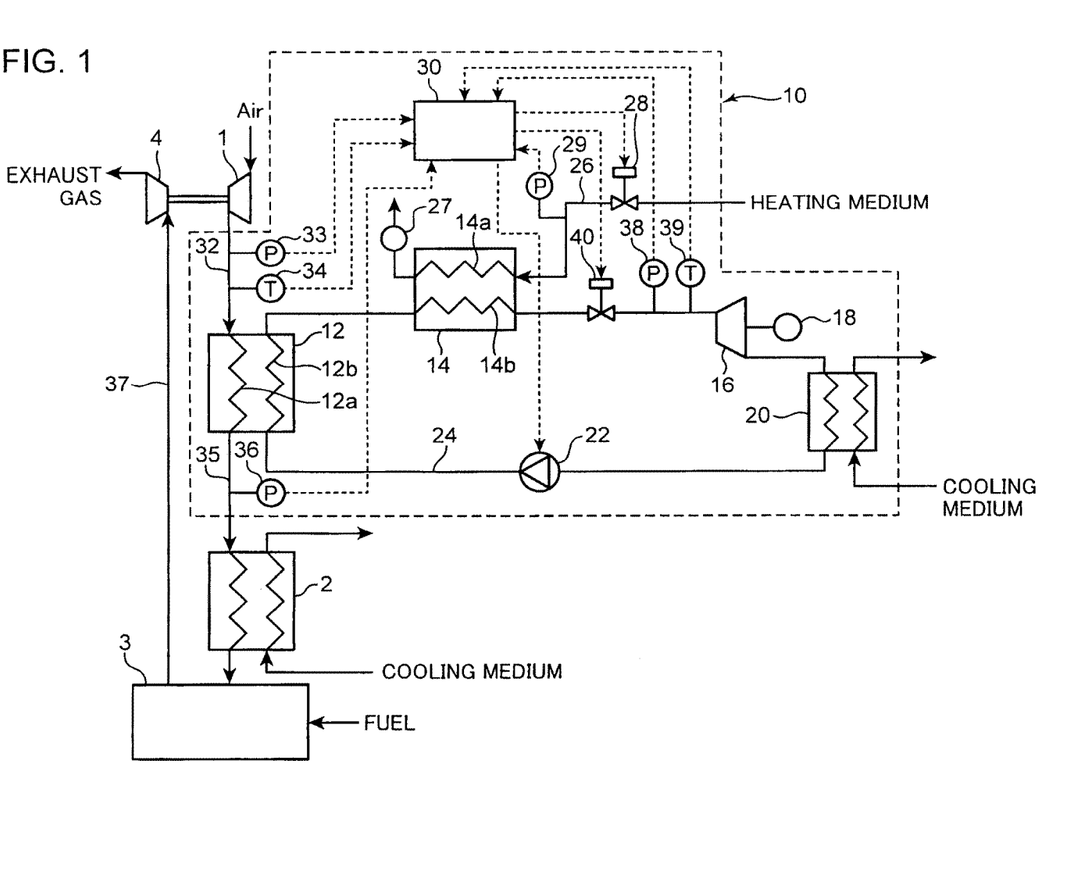
FIG. 1 is a diagram showing an overview of the configuration of a waste heat recovery device according to one embodiment of the present invention.

The waste heat recovery device 10 according to one embodiment of the present invention is described here with reference to FIG. 1.

As shown in FIG. 1, the waste heat recovery device 10 includes: a heater 12, a heat exchanger 14, an expander 16, a motive power recovery device 18, a condenser 20, a pump 22, a circulation flow channel 24 which connects the heater 12, the heat exchanger 14, the expander 16, the condenser 20 and the pump 22, serially in this order, and a controller 30 which implements various controls. The waste heat recovery device 10 according to the present embodiment is installed in a ship and recovers waste heat from an engine equipped with a supercharger.

The supercharger-equipped engine has a supercharger, an engine 3, air intake lines 32, 35, an exhaust line 37, and a gas cooler 2 provided in the air intake line. The supercharger has a compressor 1 and a turbine 4 connected to this compressor 1. The supercharging air which has been compressed by the compressor 1 is supplied to the gas cooler 2 via the air intake line, and is cooled in the gas cooler. In the gas cooler 2, seawater, for example, is used as a cooling medium for cooling the supercharging air. Supercharging air which has flowed out from the gas cooler 2 is supplied to the engine 3 via the air intake line. The exhaust gas of the engine 3 is sent to the turbine 4 via the exhaust line 37. The turbine 4 is driven by the expansion energy of the exhaust gas, and the compressor 1 is driven by the drive force of the turbine 4. The waste heat recovery device 10 recovers waste heat from the supercharging air, due to the heater 12 being connected to a portion of the air intake line between the compressor 1 and the gas cooler 2.

The heater 12 evaporates an working medium by exchanging heat between the working medium in liquid form, and the supercharging air which is compressed by the compressor 1. More specifically, the heater 12 has a first flow channel 12a in which supercharging air supplied from the compressor 1 via a first pipe 32 of the air intake line flows, and a second flow channel 12b in which the working medium flows. The supercharging air which has flowed out from the heater 12 flows in to the gas cooler 2 via a second pipe 35 of the air intake line.

The heat exchanger 14 is provided in a portion of the circulation flow channel 24 to the downstream side of the heater 12. Furthermore, the heat exchanger 14 is connected to a steam line which is provided inside the ship. The heat exchanger 14 heats the working medium by exchanging heat between the working medium which has flowed out from the heater 12 and surplus steam (a heating medium) generated by the ship. More specifically, the heat exchanger 14 has a first flow channel 14a in which steam supplied via the steam supply pipe (heating medium supply pipe) 26 flows, and a second flow channel 14b in which the working medium flows. An adjustment valve 28 of which the degree of opening being adjustable, and a pressure sensor 29, are provided in the steam supply pipe 26. The flow rate and the pressure of the steam supplied from the steam supply pipe 26 to the heat exchanger 14 varies in accordance with the degree of opening of the adjustment valve 28. A steam trap 27 may be arranged in a steam outlet pipe from the heat exchanger 14. Since the amount of steam that is condensed in the heat exchanger 14 is determined, then the flow volume of the steam is adjusted automatically by arranging the steam trap 27. A shell and tube heat exchanger or a plate-type heat exchanger may be used as the heat exchanger 14.

The expander 16 is provided in a portion of the circulation flow channel 24 to the downstream side of the heat exchanger 14. In the present embodiment, a volume-type screw expander having a rotor which is driven to rotate by the expansion energy of an working medium in gas form which has flowed out from the heat exchanger 14 is used as the expander 16. More specifically, this expander 16 has a casing inside which a rotor chamber is formed, and a male/female pair of screw rotors which are supported rotatably inside the rotor chamber. In the expander 16, the screw rotor is driven to rotate by the expansion energy of the working medium in gas form supplied to the rotor chamber from an air intake port formed in the casing. The working medium of which the pressure has been reduced by expansion inside the rotor chamber is discharged into the circulation flow channel 24 from an exhaust port formed in the casing. The expander 16 is not limited to being a volume-type screw expander, and it is also possible to use a centrifugal or scroll type expander.

The motive power recovery device 18 is connected to the expander 16. In the present embodiment, a power generator is used as the motive power recovery device 18. This motive power recovery device 18 has a rotary shaft which is connected to one of the pair of screw rotors of the expander 16. The motive power recovery device 18 generates electric power due to the rotary shaft rotating with the rotation of the screw rotor. Apart from an electric power generator, it is also possible to use a compressor, or the like, as the motive power recovery device 18.

The condenser 20 is provided in a portion of the circulation flow channel 24 to the downstream side of the expander 16. The condenser 20 condenses (liquefies) the working medium by cooling same by a cooling medium. Seawater, for example, is used as a cooling medium which is supplied to the condenser 20.

The pump 22 is provided in a portion of the circulation flow channel 24 to the downstream side of the condenser 20 (a portion between the heater 12 and the condenser 20). The pump 22 pressurizes the working medium in liquid form which has been condensed by the condenser 20, to a prescribed pressure, and sends the working medium out to the downstream side of the pump 22 in the circulation flow channel 24. A centrifugal pump provided with an impeller as a rotor, or a gear pump having a rotor formed of a pair of gears, or the like, is used as the pump 22.

The controller 30 increases and decreases the number of revolutions (frequency) of the pump 22 in accordance with the increase and decrease in the load of the engine 3. Since the flow volume of the supercharging air which flows into the heater 12 (the amount of heat input to the heater 12) is increased and decreased in accordance with increase and decrease in the load of the engine 3, then it is possible to recover the waste heat in the heater 12 efficiently by increasing and decreasing the number of revolutions of the pump 22 (extracting motive power in the motive power recovery device 18), accordingly. In the present embodiment, the controller 30 increases and decreases the number of revolutions of the pump 22 in accordance with increase and decrease in a differential pressure ΔP between the pressure of the supercharging air before flowing into the heater 12 and the pressure of the supercharging air after having flowed out from the heater 12. The differential pressure ΔP is calculated by subtracting the detection value of a second pressure sensor 36 provided in a second pipe 35 which is positioned to the downstream side of the heater 12 in the air intake line, from the detection value of the first pressure sensor 33 provided in a first pipe 32 which is positioned to the upstream side of the heater 12 in the air intake line.

Figure 2:
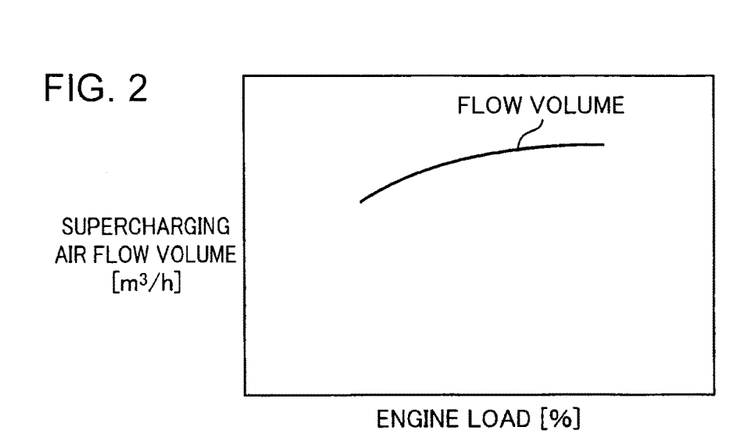
FIG. 2 is a diagram showing a relationship between a load on an engine and a flow volume of supercharging air.
Figure 3:
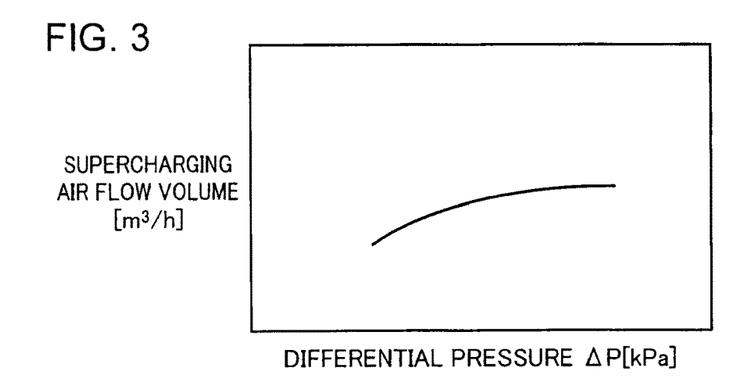
FIG. 3 is a diagram showing a relationship between a differential pressure and a flow volume of supercharging air.
Figure 4:
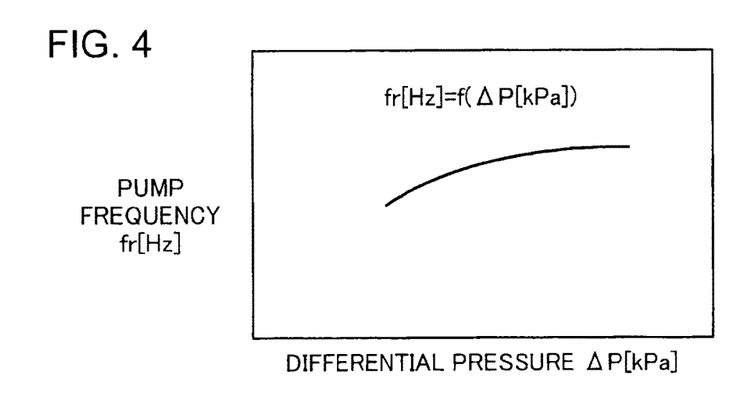
FIG. 4 is a diagram showing a relationship between a differential pressure and the number of revolutions of a pump.
Figure 5:
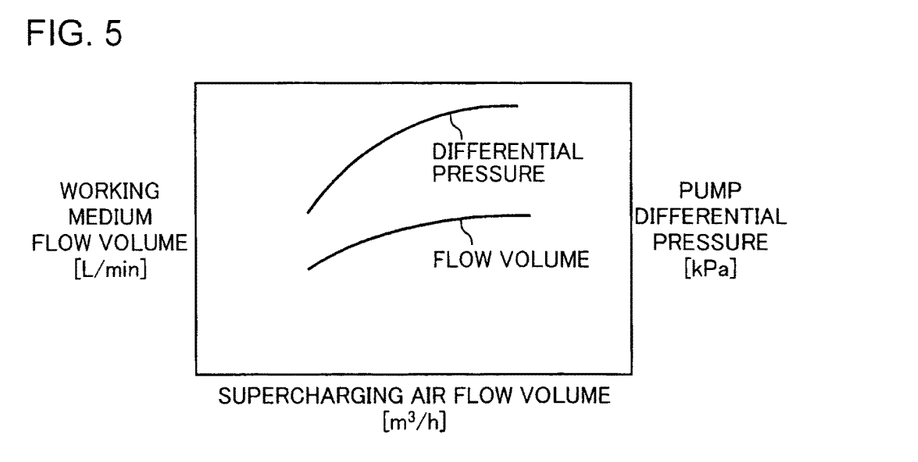
FIG. 5 is a diagram showing a relationship between a flow volume of supercharging air and a flow volume of an working medium, and a relationship between a flow volume of supercharging air and a differential pressure of a pump.
Figure 6:
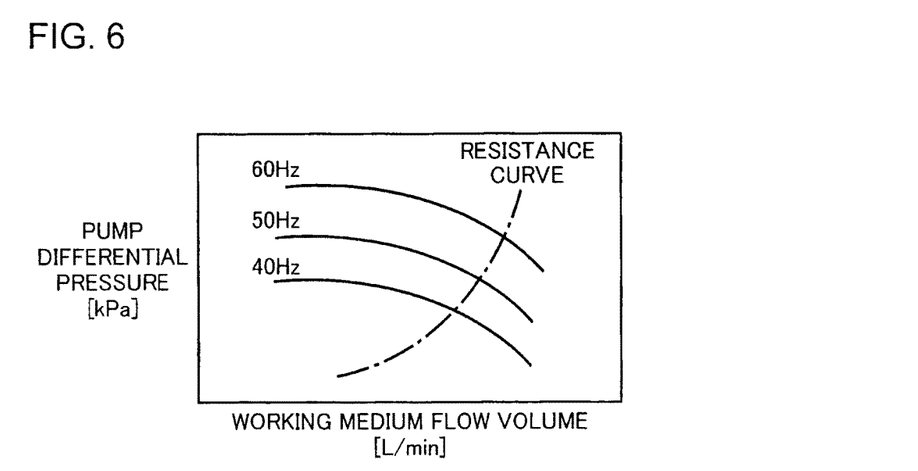
FIG. 6 is a diagram showing pump characteristics and a resistance curve of a pump.

As shown in FIG. 2, there is a relationship between the load on the engine 3 and the flow volume of the supercharging air in the engine 3, whereby the flow volume of the supercharging air increases as the load on the engine 3 increases. Furthermore, as shown in FIG. 3, there is a relationship between the differential pressure ΔP and the flow volume of the supercharging air, whereby the flow volume of the supercharging air increases as the differential pressure ΔP increases. From this information, it is determined that the load on the engine 3 and the differential pressure ΔP have a relationship whereby the differential pressure ΔP also increases and decreases in accordance with increase and decrease in the load on the engine 3. In other words, the load on the engine 3 is estimated from the differential pressure ΔP. On the other hand, as shown in FIG. 4, a relationship between the differential pressure ΔP and the optimal frequency (number of revolutions) of the pump 22 with respect to the differential pressure ΔP is calculated in advance. Information representing a relationship between the differential pressure ΔP and the optimal frequency (number of revolutions) of the pump is stored in the controller 30. Consequently, it is possible to recover the motive power efficiently in accordance with the load on the engine 3, by controlling the number of revolutions of the pump 22 so as to become a number of revolutions determined on the basis of the information stored in the controller 30. The information in FIG. 4 (the information representing the relationship between the differential pressure ΔP and the optimal frequency of the pump) is determined from FIG. 3, FIG. 5 and FIG. 6. FIG. 5 is a diagram showing the increase in the flow volume of the working medium and the differential pressure of the pump 22, in such a manner that the degree of superheating of the working medium is optimal in accordance with the increase in the flow volume of the supercharging air. FIG. 6 is a diagram showing the pump characteristics and the resistance curve of the pump 22.

Furthermore, the controller 30 adjusts the inflow amount of steam to the heat exchanger 14, by adjusting the degree of opening of the adjustment valve 28, in such a manner that the degree of superheating α of the working medium which has flowed out from the heat exchanger 14 comes within a set range, with the detection value of the pressure sensor 29 in a range of equal to or lower than a previously established upper limit value. More specifically, when the degree of opening of the adjustment valve 28 is increased, the amount of steam flowing into the heat exchanger 14 (the heat inflow amount) becomes greater. Therefore, the degree of superheating α becomes greater. Conversely, when the degree of opening of the adjustment valve 28 is reduced, the amount of steam flowing into the heat exchanger 14 (the heat inflow amount) becomes smaller. Therefore, the degree of superheating α becomes smaller. The degree of superheating α is determined from the respective detection values of the third pressure sensor 38 and the third temperature sensor 39, which are provided in the portion of the circulation flow channel 24 between the heat exchanger 14 and the expander 16. Below, the control contents for adjusting the degree of opening of the adjustment valve 28 by the controller 30 are described with reference to FIG. 7.

Figure 7:
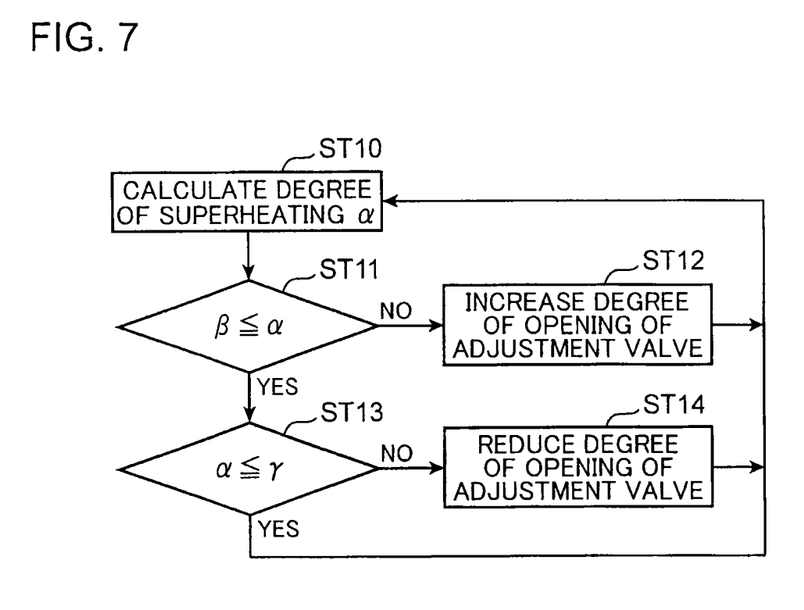
FIG. 7 is a flowchart showing control contents of a controller.

Firstly, the controller 30 calculates the degree of superheating α on the basis of the detection values of the third pressure sensor 38 and the third temperature sensor 39 (step ST10). The steam pressure curve of the working medium is stored previously in the controller 30.

Next, the controller 30 determines whether or not the degree of superheating α is equal to or greater than a lower limit value β of the set range (step ST11). As a result of this, if the degree of superheating α is smaller than the lower limit value β (NO at step ST11), the controller 30 increases the degree of opening of the adjustment valve 28 in order to increase the amount of steam supplied to the heat exchanger 14 (step ST12), and then returns to step ST10. On the other hand, if the degree of superheating α is equal to or greater than the lower limit value β (YES at step ST11), then the controller 30 determines whether or not the degree of superheating α is equal to or lower than the upper limit value γ of the set range (step ST13).

As a result of this, if the degree of superheating α is greater than the lower limit value γ (NO at step ST13), the controller 30 reduces the degree of opening of the adjustment valve 28 in order to reduce the amount of steam supplied to the heat exchanger 14 (step ST14), and then returns to step ST10. On the other hand, if the degree of superheating α is equal to or lower than the upper limit value γ (YES at step ST13), then the controller 30 returns to step ST10 since the amount of steam supplied to the heat exchanger 14 should be maintained.

Figure 8:
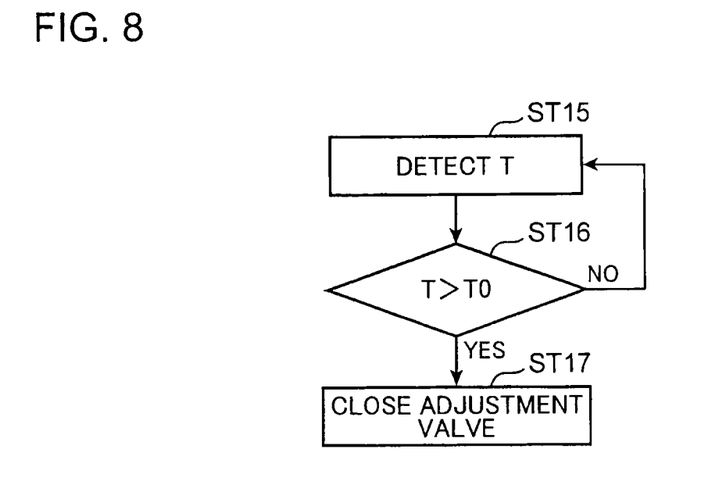
FIG. 8 is a flowchart showing control contents of a controller.

In the control described above, the controller 30 detects the detection value T of the first temperature sensor 34 which is provided in the first pipe 32 positioned on the upstream side of the heater 12 in the air intake line, as shown in FIG. 8 (step ST15), and determines whether or not this detection value T has exceeded a reference temperature T0 (step ST16). If, as a result of this, the detection value T exceeds the reference temperature T0 (YES at step ST16), in other words, if the amount of heat input to the heater 12 exceeds the reference amount, then the controller 30 closes the adjustment valve 28 (step ST17). The reference temperature T0 is set to a temperature which is equal to or greater than the temperature of the steam supplied to the heat exchanger 14. In other words, when the temperature of the working medium input to the heat exchanger 14 after exchanging heat with the supercharging air in the heater 12 is equal to or greater than the temperature of the steam supplied to the heat exchanger 14, then the working medium is cooled by the steam in the heat exchanger 14. Therefore, the controller 30 closes the adjustment valve 28 when the detection value T of the first temperature sensor 34 has exceeded the reference temperature T0. The temperature of the steam may be stored in advance in the controller 30 or may be detected by providing a temperature sensor in the steam supply pipe 26.

As described above, in the present waste heat recovery device 10, when the differential pressure ΔP is large (when the engine 3 is operating at high load), then the amount of heat which can be received by the working medium in the heater 12 becomes sufficiently large. Therefore, by increasing the number of revolutions of the pump 22 accordingly, it is possible to recover motive power effectively in the motive power recovery device 18. On the other hand, if the differential pressure ΔP is small (if the engine 3 is operating at low load), then the amount of heat that can be received by the working medium in the heater 12 is reduced. Therefore, the number of revolutions of the pump 22 is reduced accordingly. In this case, even if the working medium flows out from the heater 12 in a gas-liquid two-phase state, the working medium receives the amount of heat not sufficient to become a single gas phase, from the steam in the heat exchanger 14, and therefore flows out from the heat exchanger 14 in a single gas phase (in the form of a gas). This working medium in gas form flows into the expander 16. Therefore, even if the differential pressure ΔP is small, it is still possible to recover the motive power effectively in the motive power recovery device 18. In other words, in the present waste heat recovery device 10, it is possible to recover waste heat stably and efficiently, in a broad range from a state of low to high engine load.

Furthermore, since the controller 30 adjusts the degree of opening of the adjustment valve 28 in such a manner that the degree of superheating α of the working medium which has flowed out from the heat exchanger 14 comes within the set range, then the working medium in gas form having a degree of superheating α within the set range flows into the expander 16. Consequently, the expander 16 is driven in a more stable fashion.

Moreover, the controller 30 closes the adjustment valve 28 when the temperature of the supercharging air flowing into the heater 12 exceeds the reference temperature T0 (is a temperature equal to or greater than the temperature of the steam supplied to the heat exchanger 14). This is because there is no need to use the steam, and therefore wasteful use of the steam can be avoided.

Furthermore, the engine 3 of the embodiment described above is a ship engine, and the steam supply pipe 26 supplies excess steam generated by the ship, to the heat exchanger 14. In other words, since the excess steam generated in the ship is used efficiently, then it is possible to recover waste heat stably in a state of low load on the ship engine 3, without providing special means for generating a heating medium to be supplied to the heat exchanger 14.

The embodiment disclosed here is exemplary in all respects and should not be regarded as restrictive. The scope of the present invention is indicated by the scope of the claims and not by the description given above, and includes all modifications within the same sense and scope as the claims.

For example, in the embodiment described above, an example is given in which information representing the relationship between the differential pressure ΔP and the optimal frequency of the pump is stored in the controller 30, but the controller 30 may also store a map which indicates a relationship between the differential pressure ΔP and the optimal frequency of the pump.

Furthermore, the controller 30 stops the operation of the waste heat recovery device 10 by closing the shut-off valve 40 provided in the circulation flow channel 24 between the heat exchanger 14 and the expander 16, when a problem occurs in the waste heat recovery device 10.

The embodiments described above are now summarized.

The waste heat recovery device according to the present embodiment includes: a heater which evaporates an working medium by exchanging heat between supercharging air supplied to an engine and the working medium; a heat exchanger which heats the working medium by exchanging heat between the working medium which has flowed out from the heater and a heating medium; an expander which expands the working medium which has flowed out from the heat exchanger; a motive power recovery device which is connected to the expander; a condenser which condenses the working medium which has flowed out from the expander; and a pump which sends the working medium which has flowed out from the condenser to the heater.

In the present waste heat recovery device, when the engine is operated at high load, the amount of heat which can be received by the working medium in the heater is sufficiently large. On the other hand, when the engine is operated at low load, the amount of heat which can be received by the working medium in the heater is reduced. In this case, even if the working medium flows out from the heater in a gas-liquid two-phase state, the working medium receives the amount of heat not sufficient to become a single gas phase, from the heating medium in the heat exchanger, and therefore flows out from the heat exchanger and flows into the expander in the form of a gas. Therefore, even if the engine is operating at low load, it is possible to recover motive power efficiently in the motive power recovery device. In other words, in the present waste heat recovery device, it is possible to recover waste heat stably, in a broad range from a state of low to high engine load.

In this case, desirably, the waste heat recovery device further comprises a controller which increases and reduces the number of revolutions of the pump in accordance with increase and decrease in the differential pressure between the pressure of the supercharging air before flowing into the heater and the pressure of the supercharging air after having flowed out from the heater.

By adopting a configuration of this kind, it is possible to recover waste heat stably and efficiently, in a broad range from a state of low to high engine load. More specifically, when the differential pressure is large (when the engine is operating at high load), the amount of heat that can be received by the working medium in the heater is sufficiently large, and therefore it is possible to recover motive power effectively in the motive power recovery device, by increasing the number of revolutions of the pump accordingly. On the other hand, when the differential pressure is small (when the engine is operating at low load), the amount of heat that can be received by the working medium in the heater is reduced, and therefore the number of revolutions of the pump is reduced accordingly. In this case also, the working medium flows out from the heat exchanger into the expander in the form of a gas.

Furthermore, in this case, desirably, the waste heat recovery device further comprises: a heating medium supply pipe for supplying the heating medium to the heat exchanger; and an adjustment valve which is provided in the heating medium supply pipe, the degree of opening thereof being adjustable; wherein the controller adjusts the degree of opening of the adjustment valve in such a manner that the degree of superheating of the working medium which has flowed out from the heat exchanger comes within a set range.

By adopting this configuration, since the working medium in the form of gas having a degree of superheating in a set range flows into the expander, then it is possible to drive the expander more stably.

More specifically, desirably, the controller closes the adjustment valve when the temperature of the supercharging air flowing into the heater exceeds a reference temperature.

By adopting this configuration, since the supply of excessive heating medium to the heat exchanger is stopped, then the working medium can be made to flow into the expander in a suitable state.

Furthermore, desirably, in the present invention, the engine is a ship engine; and the heating medium supply pipe is configured so as to be able to supply excess steam generated in the ship to the heat exchanger, as the heating medium.

By adopting this configuration, it is possible to recover waste heat stably in a state of low load on the ship engine by efficiently using the excess steam generated in the ship, without providing special means for generating a heating medium to be supplied to the heat exchanger.

The waste heat recovery method according to the embodiment described above is a method for recovering waste heat from supercharging air supplied to an engine. This waste heat recovery method includes: an evaporating step for evaporating an working medium by a heater, by supplying the supercharging air to the heater; a heating step for heating the working medium by exchanging heat between the working medium which has flowed out from the heater and a heating medium in use of a heat exchanger; a motive power recovery step for recovering motive power from the working medium, by expanding the working medium which has flowed out from the heat exchanger in use of an expander; a condensing step for condensing the working medium which has flowed out from the expander in use of a condenser; and a pump driving step for sending in use of a pump the working medium which has flowed out from the condenser to the heater, wherein in the pump driving step, the number of revolutions of the pump is increased and reduced in accordance with increase and decrease in a differential pressure between pressure of the supercharging air before flowing into the heater and pressure of the supercharging air after having flowed out from the heater.

In this invention also, it is possible to recover waste heat stably, in a broad range from a state of low to high engine load.

More specifically, in the heating step, desirably, the amount of the heating medium flowing into the heat exchanger is adjusted in such a manner that the degree of superheating of the working medium which has flowed out from the heat exchanger comes within a set range.

Moreover, desirably, in the heating step, the inflow of the heating medium to the heat exchanger is halted when the temperature of the supercharging air flowing into the heater exceeds a reference temperature.

Furthermore, desirably, in the present invention, a ship engine is used as the engine; and excess steam generated in the ship is used as a heating medium which is supplied to the heat exchanger.

This application is based on Japanese Patent application No. 2014-077646 filed in Japan Patent Office on Apr. 4, 2014, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A waste heat recovery device, comprising:
a heater which evaporates a working medium by exchanging heat between supercharging air supplied to an engine and the working medium;
a heat exchanger which heats the working medium by exchanging heat between the working medium which has flowed out from the heater and a heating medium;
an expander which expands the working medium which has flowed out from the heat exchanger;
a motive power recovery device having a rotary shaft which is connected to the expander;
a condenser which condenses the working medium which has flowed out from the expander;
a pump which sends the working medium which has flowed out from the condenser to the heater; and
a controller which increases and reduces the number of revolutions of the pump in accordance with an increase and decrease in a differential pressure between a pressure of the supercharging air before flowing into the heater and the pressure of the supercharging air after having flowed out from the heater, such that the number of revolutions of the pump invariably increases or decreases in the same direction as an increase or decrease in said differential pressure.

2. The waste heat recovery device according to claim 1, further comprising:
a heating medium supply pipe which supplies the heating medium to the heat exchanger; and
an adjustment valve which is provided in the heating medium supply pipe, the degree of opening thereof being adjustable, wherein
the controller adjusts the degree of opening of the adjustment valve such that the degree of superheating of the working medium which has flowed out from the heat exchanger comes within a set range.

3. The waste heat recovery device according to claim 2, wherein the controller closes the adjustment valve when the temperature of the supercharging air flowing into the heater exceeds a reference temperature.

4. The waste heat recovery device according to claim 2, wherein
the engine is a ship engine in a ship; and
the heating medium supply pipe is configured so as to be able to supply excess steam generated in the ship to the heat exchanger, as the heating medium.

5. The waste heat recovery device according to claim 3, wherein
the engine is a ship engine in a ship; and
the heating medium supply pipe is configured so as to be able to supply excess steam generated in the ship to the heat exchanger, as the heating medium.

6. A waste heat recovery method for recovering waste heat from supercharging air supplied to an engine, the method comprising:
an evaporating step for evaporating a working medium by a heater, by supplying the supercharging air to the heater;
a heating step for heating the working medium by exchanging heat between the working medium which has flowed out from the heater and a heating medium by use of a heat exchanger;
a motive power recovery step for recovering motive power from the working medium, by expanding the working medium which has flowed out from the heat exchanger by use of an expander;
a condensing step for condensing the working medium which has flowed out from the expander by use of a condenser; and
a pump driving step for sending, by use of a pump, the working medium which has flowed out from the condenser to the heater, wherein
in the pump driving step, the number of revolutions of the pump is increased and reduced in accordance with an increase and decrease in a differential pressure between a pressure of the supercharging air before flowing into the heater and the pressure of the supercharging air after having flowed out from the heater, such that the number of revolutions of the pump invariably increases or decreases in the same direction as an increase or decrease in said differential pressure.

7. The waste heat recovery method according to claim 6, wherein, in the heating step, the amount of the heating medium flowing into the heat exchanger is adjusted such that the degree of superheating of the working medium which has flowed out from the heat exchanger comes within a set range.

8. The waste heat recovery method according to claim 7, wherein, in the heating step, the inflow of the heating medium to the heat exchanger is halted when the temperature of the supercharging air flowing into the heater exceeds a reference temperature.

9. The waste heat recovery method according to claim 6, wherein
a ship engine is used as the engine; and excess steam generated in a ship is used as a heating medium to be supplied to the heat exchanger.

10. The waste heat recovery method according to claim 7, wherein
a ship engine in a ship is used as the engine; and
excess steam generated in the ship is used as a heating medium to be supplied to the heat exchanger.

11. The waste heat recovery method according to claim 8, wherein
a ship engine in a ship is used as the engine; and
excess steam generated in the ship is used as a heating medium to be supplied to the heat exchanger.

12. A power system comprising:
an engine;
a supercharger comprising a turbine configured to be driven by exhaust gas from the engine, and a compressor connected to the turbine and configured to supercharge air supplied to the engine;
a heater configured to exchange heat in the heater between the supercharging air supplied to the engine and a working medium, to evaporate the working medium;
a heat exchanger configured to exchange heat between the working medium which has flowed out from the heater and a heating medium, to further heat the working medium;
an expander configured to expand the working medium which has flowed out from the heat exchanger;
a motive power recovery device having a rotary shaft which is connected to the expander;
a condenser configured to condense the working medium which has flowed out from the expander; and
a pump configured to send the working medium which has flowed out from the condenser to the heater; and
a controller which increases and reduces the number of revolutions of the pump in accordance with an increase and decrease in a differential pressure between a pressure of the supercharging air before flowing into the heater and the pressure of the supercharging air after having flowed out from the heater, such that the number of revolutions of the pump invariably increases or decreases in the same direction as an increase or decrease in said differential pressure.

13. The power system according to claim 12, wherein
the engine is a ship engine in a ship; and
the heating medium is excess steam generated in the ship.

* * * * *